(12) United States Patent
Hall

(10) Patent No.: US 7,532,787 B2
(45) Date of Patent: May 12, 2009

(54) CONTINUOUS OPTICAL NULL TRACKING METHOD FOR OPTICAL SWITCH

(75) Inventor: David B. Hall, La Crescents, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 0 days.

(21) Appl. No.: 11/823,344

(22) Filed: Jun. 27, 2007

(65) Prior Publication Data
US 2009/0003766 A1    Jan. 1, 2009

(51) Int. Cl.
*G02B 6/42* (2006.01)
(52) U.S. Cl. ....................................... 385/16
(58) Field of Classification Search ............. None
See application file for complete search history.

(56) References Cited
U.S. PATENT DOCUMENTS
2003/0112487 A1* 6/2003 Fuller et al. ............... 359/239
2003/0231891 A1* 12/2003 Kuzukami et al. ........... 398/198
2007/0019968 A1* 1/2007 Hashimoto et al. .......... 398/198

\* cited by examiner

*Primary Examiner*—Sung H Pak
(74) *Attorney, Agent, or Firm*—Patti, Hewitt & Arezina LLC

(57) ABSTRACT

A method and apparatus are provided for real-time correction of a voltage drift of an optical switch. The correction may be made without interrupting an optical data stream of the optical switch. Three voltage states of the optical switch may be monitored continuously to determine whether a voltage drift has occurred. Upon determining that the voltage drift has occurred, a signal processing unit with voltage correction circuitry may apply a voltage to a single port of the optical switch to adjust the three voltages of the optical switch equally to achieve a minimum null signal. The technique may be extended to adjust a voltage drift of multiple optical switches connected in series.

17 Claims, 6 Drawing Sheets

$V_{min} = -7.2$ volts   $V_{max} = 6.7$ volts   $V_a = 4.044$ volts   $V_b = 10.044$ volts $P(V_a) = P(V_b) = 0.935$   Optical Bias $V1_0$ Solid Curve    $V_{min} = -7.2$ volts    Optical Bias $V1_0$
Dotted Curve   $V_{min} = -5.2$ volts    Optical Bias $V2_0 = V1_0 + 2$ volts

CONTINUOUS OPTICAL NULL TRACKING METHOD FOR OPTICAL SWITCH

STATEMENT OF GOVERNMENT RIGHTS

This invention was made with Government support under Contract No. 4500088 NONREC. The government has certain rights in this invention.

TECHNICAL FIELD

This invention relates to the art of optical switching, and more particularly to a method of correcting a voltage drift experienced by an optical switch in real-time.

BACKGROUND

A variety of guided wave optical switches have been proposed for fiber optic acoustic sensor systems. These switches include 1×1 on-off switches, 1×2 blocking switches, and 1×8 blocking switches. One characteristic requirement for all of these switches is a high extinction ratio in the off state. An extinction ratio is the ratio of two optical power levels, e.g., P 1/P 2, of a digital signal generated by an optical source, where P 1 is the optical power level generated when the light source is "on," and P 2 is the power level generated when the light source is "off.".

For different switch architectures, e.g., Mach Zehnder interferometers and delta beta reversal switches, an extinction ratio of up to 40 dB or more for each switch can be obtained with an appropriate voltage level. This extinction ratio degrades over time and temperature, resulting in voltage drift, unless the voltage level is adjusted to maintain a minimum null signal.

One prior art technique used to exercise an applied voltage to track and maintain the optical null requires interruption of an optical data flow in a working system. Disadvantageously, the prior art technique requires the system to be off-line.

Another prior art technique requires the application of a small dither voltage to the direct current (DC) port and the use of a hill climb servo to find the optimum DC bias point. Disadvantageously, this technique introduces excess noise into the system.

SUMMARY

It has been recognized, in accordance with the principles of the invention, that the problems of the prior art can be overcome by a technique for continuous optical null tracking and voltage correction without interruption of the optical data flow. More specifically, the present invention provides an apparatus having a) means for monitoring three voltages of the optical switch; and b) means for applying a voltage to one port of the optical switch to adjust the three voltages in real-time.

Also, the present invention provides a method having the steps of a) monitoring three voltages of the optical switch; and b) applying a voltage to one port of the optical switch to adjust the three voltages in real-time.

DETAILED DESCRIPTION

The present invention provides a technique for a real-time correction of a voltage drift experienced by an optical switch by monitoring and correcting for a drift voltage that degrades the null signal, i.e., OFF state, of the optical switch, leading to degraded switch performance. The continuous optical null tracking method for optical switch provides the serial application of three voltage levels at one port associated with one electrode configuration of the optical switch. After an initial calibration of the optical switch, voltage monitoring and voltage tracking entails applying equal corrections to each of the three voltages to assure a minimum null signal, and the corrections may be made without interrupting an optical data stream of the optical switch.

Figure 1:
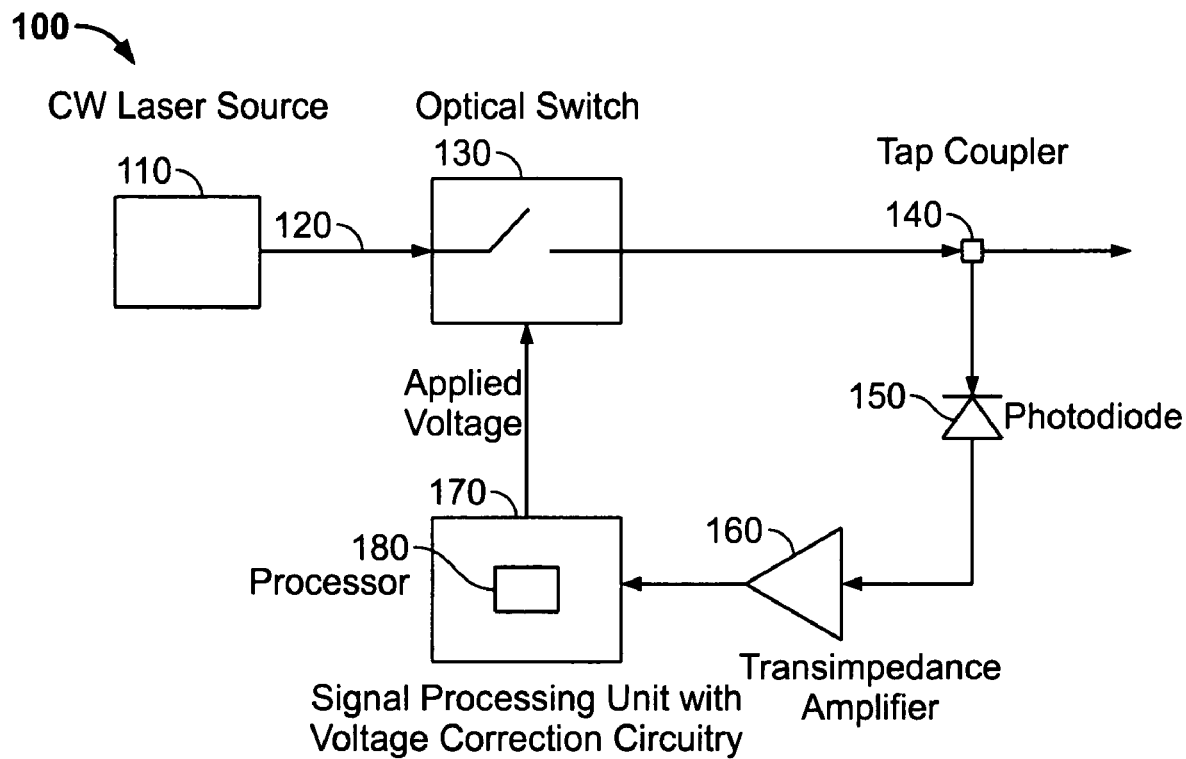
FIG. 1 shows an illustrative view of a continuous optical null tracking circuit arranged in accordance with the principles of the invention.

FIG. 1 shows an illustrative view of a continuous optical null tracking circuit 100 arranged in accordance with the principles of the invention. More particularly, shown in FIG. 1 are Continuous Wave (CW) laser source 110, optical fiber 120, optical switch 130, tap coupler 140, photodetector 150, transimpedance amplifier 160 and signal processing unit 170 with processor 180.

CW laser source 110 generates a coherent beam of electromagnetic energy continuously, which may be transmitted over optical fiber, e.g., optical fiber 120, to an optical receiver. Typically, CW laser source 110 may operate at 1320 nm or 1550 nm, but CW laser source 110 may be operable at other wavelengths. CW laser source 110 may be implemented as a distributed feedback (DFB) laser or a diode pumped fiber laser.

Optical switch 130 is an electro-optical switch that enables signals in optical fibers, e.g., optical fiber 120, or integrated optical circuits to be selectively switched from one circuit to another. Optical switch 130 receives an optical signal from CW laser source 110 as an input, and maintains the signal as light from input to output. Optical switch 130 may have electrodes which are used to selectively produce an electric field that electro-optically actuates a desired switch state, i.e., an ON or OFF state, of the optical switch, as will be appreciated by those skilled in the art. Optical switch 130 may operate over a temperature range of −40° C. to 80° C.

Optical switch 130 may be implemented as a lithium niobate Mach Zehnder interferometer or as a delta beta reversal switch. The delta beta reversal switch has only one electrode configuration associated with one port, which may be used to apply a corrective voltage to adjust for voltage drift.

The standard lithium niobate Mach Zehnder interferometer has two electrode configurations. The first electrode configuration is a radio frequency (RF) port used to apply short voltage pulses. The second electrode configuration is a direct current (DC) port used to apply the appropriate DC bias voltage. The DC voltage usually sets the switch for minimum throughput when no voltage is applied to the RF port. When operating the continuous optical null tracking circuit 100 with the Mach Zehnder interferometer, corrective voltages should be applied to the RF port rather than the DC port, because the speed of response for the DC port is too slow.

Tap coupler 140 is an optical splitter that supplies a small portion of the signal power received from optical switch 130 to a monitoring element, i.e., photodetector 150. The remainder of the signal power is supplied by tap coupler 130 to a receiver, not shown.

Photodetector 150 is a sensor of light operable to receive a portion of the signal power from the output of optical switch 130 via tap coupler 140. Photodetector 150 converts the optical signal it receives to an electrical current representation of the optical signal.

Transimpedance amplifier 160 is a device that performs current to voltage transformations. Transimpedance amplifier 160 measures a current received from photodetector 150 and changes the electrical current representation of the optical signal from a current to a voltage.

Signal processing unit 170 monitors voltages received from transimpedance amplifier 160, compares two received voltage states associated with two different voltages applied to optical switch 130, and generates voltages needed to correct a voltage drift of optical switch 130. Signal processing unit 170 monitors voltages without interrupting an optical data stream of optical switch 130. Signal processing unit 170 is capable of supplying a corrective voltage and applying it to a single port of optical switch 130. Illustratively, signal processing unit 170 may generate and apply a corrective voltage to one port of optical switch 130 to adjust a measured voltage of optical switch 130 upon determining that optical switch 130 has experienced a voltage drift, without interrupting an optical data stream of the optical switch 130.

Signal processing unit 170 may have a processor or controller, e.g., processor 180, which receives as an input the output of transimpedance amplifier 160. Processor 180 may use the output of transimpedance amplifier 160 to compare the voltage output of optical switch 130 to a previously measured voltage output. Upon making the comparison, processor 180 may make a determination as to whether there exists at least one difference between the voltage output of optical switch 130 and the previously measured voltage output. If the received voltage output and the previously measured voltage output are different, then a voltage drift has occurred. When the voltage drift occurs, processor 180 may determine the corrective voltage needed and instruct a voltage generator within signal processing unit 170 to apply the corrective voltage to a single port of optical switch 130. Processor 180 may perform signal averaging of several instances of the received voltages over a predetermined time interval so as not to rely on a single set of received voltage values, thus reducing error.

Signal processing unit 170 may correct a voltage drift upon detection of a minimum detectable signal. Noise may cause the voltage of optical switch 130 to drift a few milli-volts which may not be detected. Consequently, signal processing unit 170 may wait until the voltage of optical switch 130 has drifted a predetermined voltage, e.g., 10-20 milli-volts, before applying a corrective voltage. The sensitivity of signal processing unit 170, i.e., the predetermined voltage, may be adjustable by a user. After making a correction, signal processing unit 170 may wait a predetermined time interval, e.g., 50 milli-sec, to receive another output of transimpedance amplifier 160, and then determine whether another correction is necessary.

Figure 2:
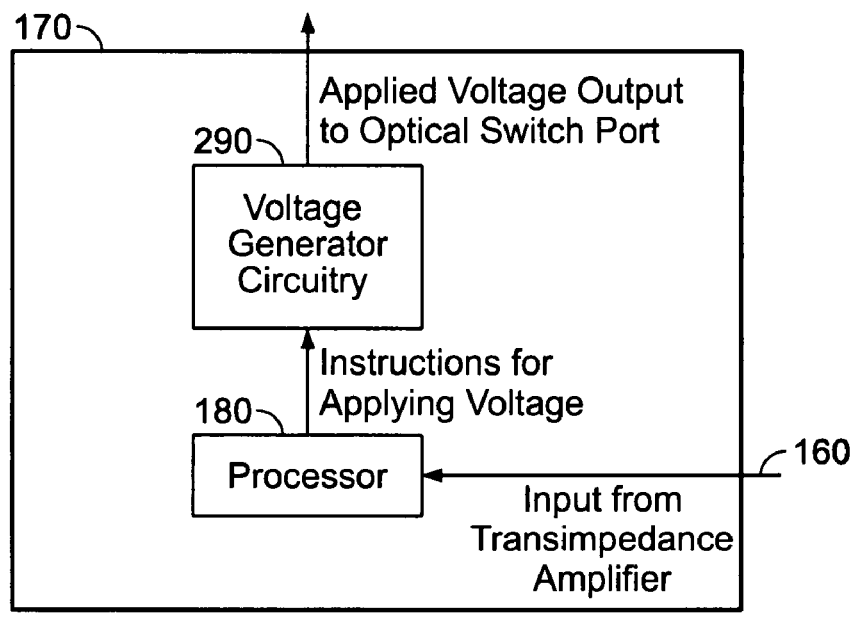
FIG. 2 shows an illustrative embodiment of a signal processor with voltage correction circuitry arranged in accordance with the principles of the invention.

FIG. 2 shows an illustrative embodiment of a signal processor with voltage correction circuitry, e.g., signal processing unit 170, arranged in accordance with the principles of the invention. In FIG. 2, processor 180 receives the output of transimpedance amplifier 160 as an input. Processor 180 is connected to voltage generator 290, which supplies an applied voltage as an output.

Processor 180 may be any type of processor capable of manipulating data and controlling the operation of signal processing unit 170. Processor 180 should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. The functions of processor 180 may be provided by a single dedicated processor, by a single shared processor, or by a plurality of individual processors, some of which may be shared.

Voltage generator 290 provides appropriate drive voltages to optical switch 130 that allows for a maximum extinction ratio of optical switch 130 in the presence of a voltage drift of the minimum null signal. Voltage generator 290 is capable of supplying both positive and negative drive voltages, as needed. Illustratively, voltage generator 290 may generate a pulse train having an amplitude that increases, e.g., a positive 15 volts, or decreases, e.g., a negative 13 volts, the measured voltage output of optical switch 130.

Figure 3:
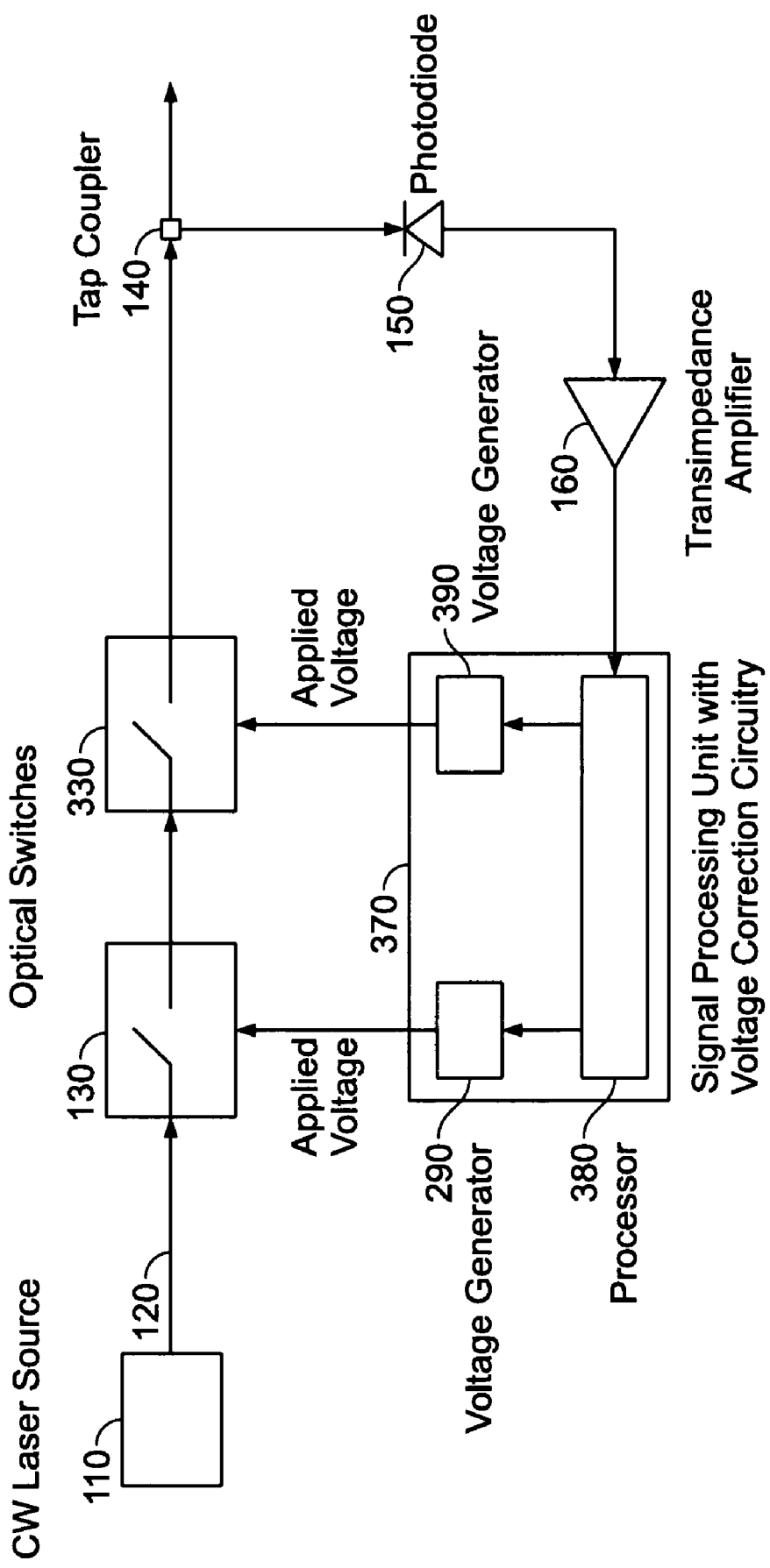
FIG. 3 shows another illustrative view of a continuous optical null tracking circuit arranged in accordance with the principles of the invention.

FIG. 3 shows another illustrative view of a continuous optical null tracking circuit arranged in accordance with the principles of the invention. Rather than employing a single optical switch as in FIG. 1, in FIG. 3, continuous optical null tracking circuit 100 employs two optical switches, e.g., optical switch 130 and optical switch 330 connected in series, along with tap coupler 140, photodetector 150, and transimpedance amplifier 160 shown in FIG. 1. Also, in this arrangement, separate voltage generators, e.g., voltage generator 290 and voltage generator 390, housed in a single signal processor configuration, i.e., signal processing unit 370, are employed to provide separate applied voltages for each optical switch. Voltage generator 290 may provide a corrective voltage to a single port of optical switch 130 to adjust a voltage drift. Also, voltage generator 390 may provide a corrective voltage to a single port of optical switch 330 to adjust a voltage drift. Voltage generator 290 and voltage generator 390 are both connected to and controlled by processor 380. In another embodiment of the invention, two separate signal processors, each having a single voltage generator connected to a processor may be employed, rather than the single signal processor configuration shown in FIG. 3.

Referring to FIG. 3, a corrective voltage cannot be applied to both optical switches simultaneously. First, processor 380 may determine whether a voltage drift has occurred in optical switch 130 by comparing a voltage received from transimpedance amplifier 160 for optical switch 130 to a previously measured voltage for optical switch 130, and determining whether there exists at least one difference between the received voltage output and the previously measured voltage output. If the received voltage output and the previously measured voltage output are different, then a voltage drift has occurred. Upon determining that the voltage drift has occurred, processor 380 may determine the corrective voltage needed and instruct voltage generator 290 to apply a voltage, e.g., a pulse train, to adjust the voltage level of optical switch 130.

Next, processor 380 may determine whether a voltage drift has occurred in optical switch 330 by comparing a voltage received from transimpedance amplifier 160 for optical switch 330 to a previously measured voltage for optical switch 330, and determining whether there exists at least one difference between the received voltage output and the previously measured voltage output. Upon determining that the voltage drift has occurred, processor 380 may determine the corrective voltage needed and instruct voltage generator 390 to apply a second voltage, e.g., a second pulse train, to adjust the voltage level of optical switch 330. The configuration of FIG. 3 may be extended to include three or more optical switches connected in series.

Figure 4:
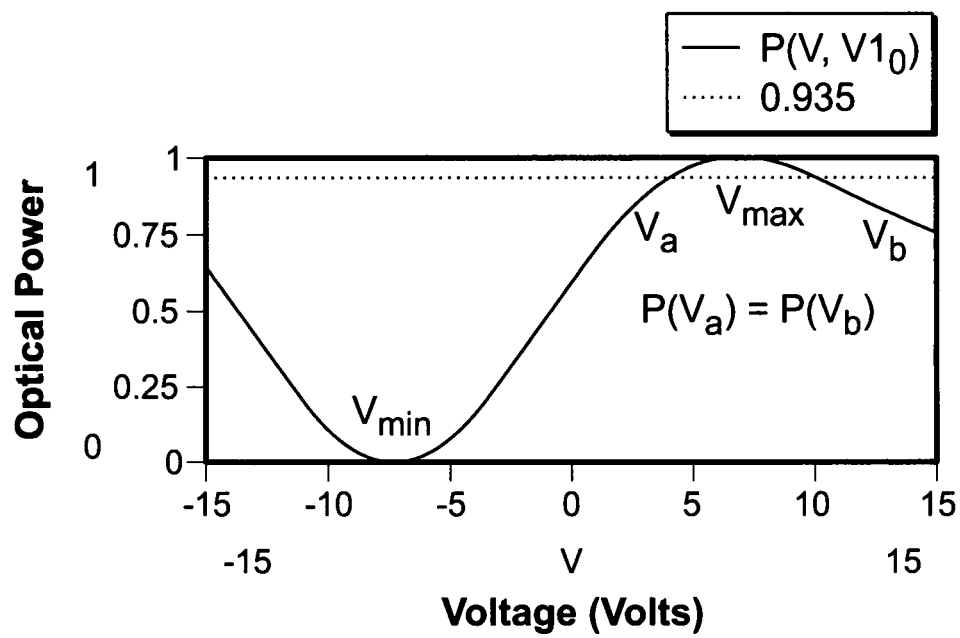
FIG. 4 shows a plot of a normalized output versus an applied voltage for an optical switch.

Prior to operating the arrangement of FIG. 1 or FIG. 3, the optical switch or switches must be calibrated to determine three voltages that may be corrected over time. FIG. 4 shows a plot of a normalized output versus an applied voltage for an optical switch, with a minimum null signal output at one voltage and a maximum output at another voltage. In the vicinity of the maximum voltage, there are two other voltages, i.e., $V_a$ and $V_b$, six volts apart that have equal output powers at 93.5% of the power at Vmax. The power at $V_a$, denoted as $P(V_a)$, and the power at $V_b$, denoted as $P(V_b)$, represent two "ON" states of the optical switch with equal output power levels close to the power of the maximum voltage, denoted as P(Vmax). The parameter $V1_0$ is an optical bias expressed as a voltage. When $P(V_a)$ does not equal $P(V_b)$, then a voltage drift has occurred.

Figure 5:
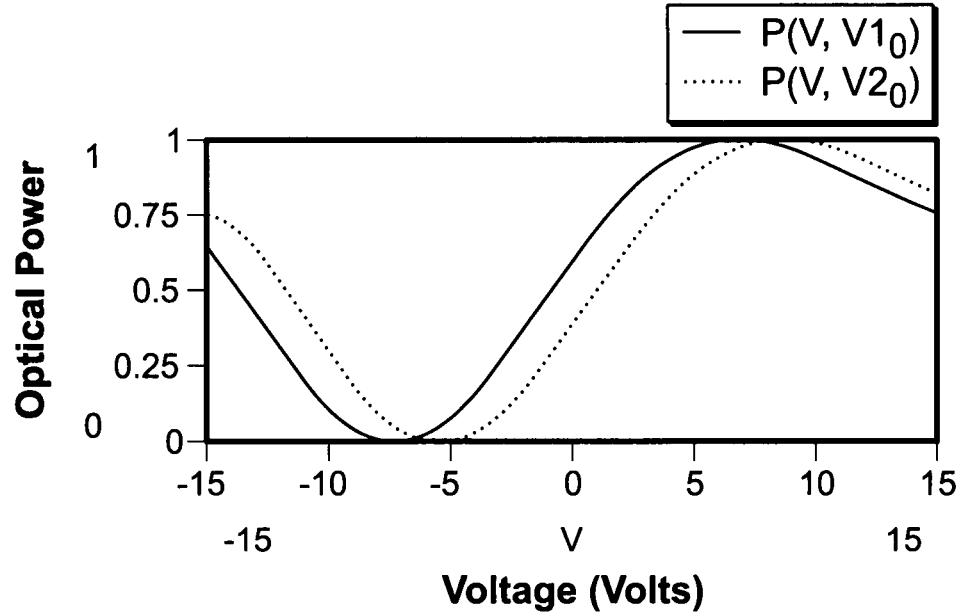
FIG. 5 shows a shift in the voltage for the minimum null signal output for the optical switch over time and temperature.

FIG. 5 shows a shift in the voltage for the minimum null signal output over time and temperature for the optical switch of FIG. 4. This shift is equivalent to a shift in the optical bias $V1_0$. In FIG. 5, the minimum null signal voltage drifts by two volts yielding the dotted curve. The transfer function of power versus voltage slides over by two volts without a change in its shape or scaling of the curve shown in FIG. 4. This property is exhibited by guided wave switches and is a key factor in the continuous tracking of the optical null.

Figure 6:
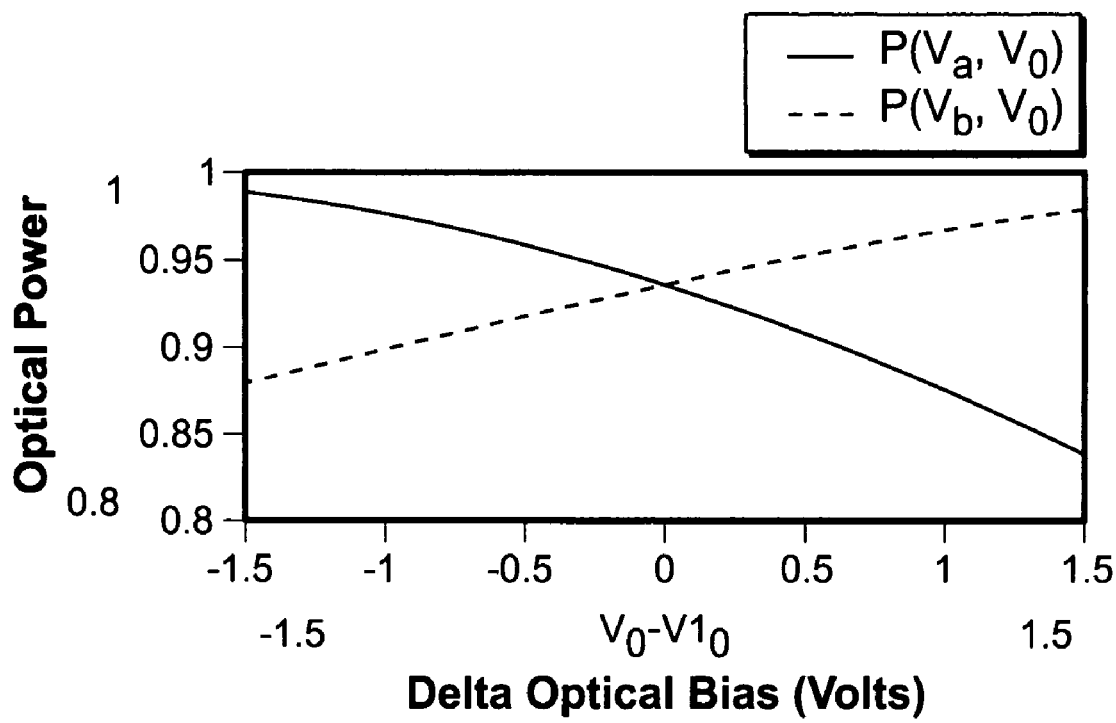
FIG. 6 shows a plot of output powers associated with voltages $V_a$ and $V_b$ as a function of the optical bias drift.

FIG. 6 shows a plot of output powers associated with voltages $V_a$ and $V_b$ as a function of the optical bias drift from the equal power status for $V_a$ and $V_b$, as shown in FIG. 4. For an optical bias drift of zero, the two powers are shown as equal in FIG. 6.

Figure 7:
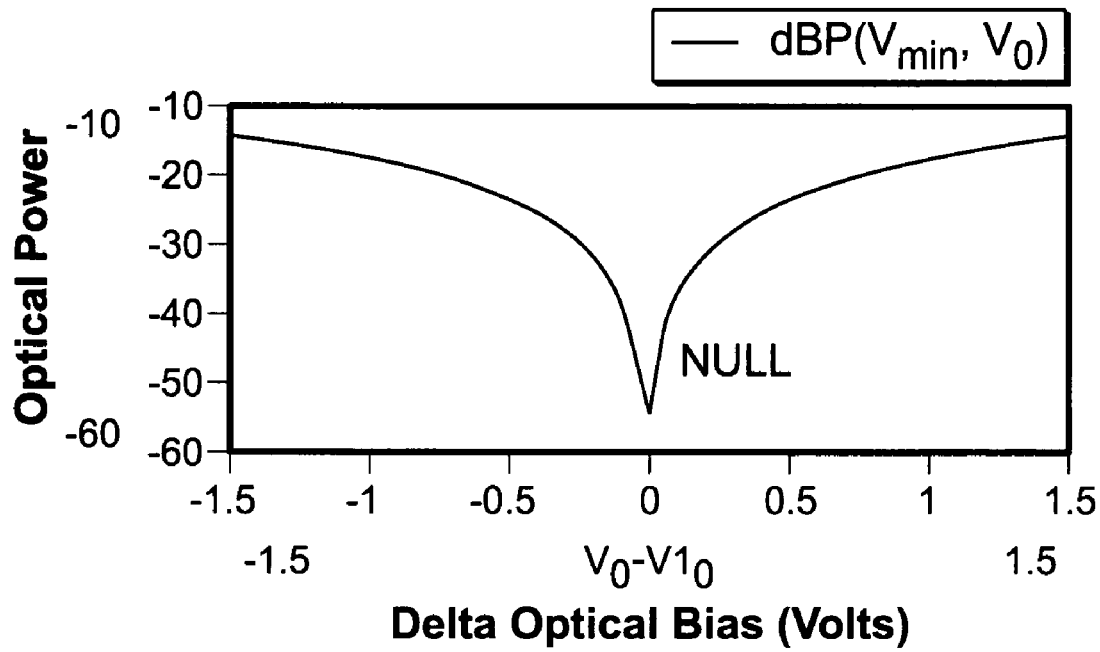
FIG. 7 is a plot of output power associated with Vmin as a function of the optical bias drift.

FIG. 7 shows a plot of output power associated with Vmin as a function of the optical bias drift in FIG. 4. Decibel units are used to show the deep null at a bias drift of zero.

A drift by a given voltage from the equal power point in FIG. 6 is a drift by the same voltage from the deepest null in FIG. 7. By monitoring the power levels associated with the "ON" states, i.e., $V_a$ and $V_b$, the correction voltage needed to establish the deepest null may be determined. The visibility function for the powers associated with $V_a$ and $V_b$ is a function of optical bias drift and is expressed as:

$$vis(v_0) = \frac{P(Va, V0) - P(Vb, V0)}{P(Va, V0) + P(Vb, V0)}$$

The visibility function is a useful ratio independent of input optical power fluctuations. For a bias drift approaching zero, the visibility goes to zero. Thus, the corrective voltage is a function of the visibility function measured at voltages $V_a$, and $V_b$. The corrective voltage needed for a reset to the minimum null signal for a measured visibility is:

Delta V(correction)=22VIS(measured).

Illustratively, a measured visibility of 0.01 needs a correction voltage of 220 mV. Second order corrections or a look up table may be used to further refine the corrective voltage needed for a given value of $VIS_M$. Referring to FIG. 4, the corrective voltage may be applied equally to the three voltages, i.e., Vmin, $V_a$, and $V_b$, associated with the minimum null signal and the two "ON" states with equal powers.

Signal averaging may be used to reduce the error in the measured visibility. Illustratively, an applied corrective voltage generated as a pulse train for the optical switch of FIG. 4 may consist of 200 nano second pulses at 5 μsec intervals. A monitor photodiode that taps a portion of the transmitted light intensity detects and sums the output of 1000 pulses at voltage $V_a$ over a period of 5 msec. Then, the photodiode detects and sums the outputs of 1000 pulses at voltage $V_b$ over a period of 5 msec. In another embodiment of the invention, a processor may sum the output of the 1000 pulses at voltage at $V_a$ and the 1000 pulses at voltage $V_b$ over a time interval.

In yet another embodiment of the invention, an alternative procedure for averaging the 2000 pulses is the switching back and forth between $V_a$ and $V_b$ for adjacent pulses. The total time for data retrieval is 10 msec. The visibility function value of the summed outputs at voltages $V_a$ and $V_b$ may then be used to program a common correction voltage for Vmin, $V_a$ and $V_b$ for the minimum null signal and two new balanced "ON" states.

Figure 8:
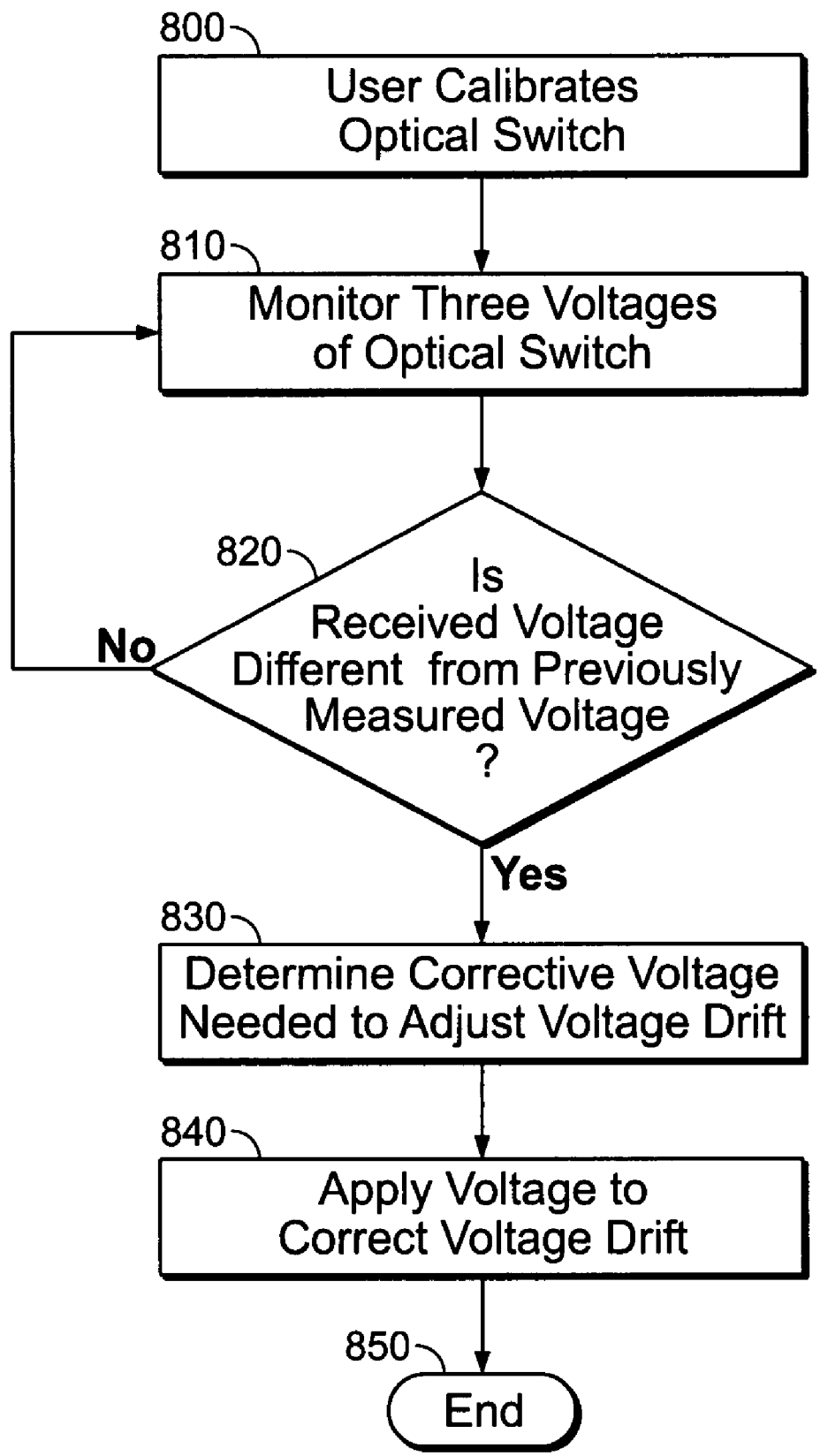
FIG. 8 shows an illustrative flow chart for a method of operating the continuous optical null tracking method for optical switch in accordance with the principles of the invention.

FIG. 8 shows an illustrative flow chart for a method of operating the continuous optical null tracking method for optical switch in accordance with the principles of the invention. The process is entered in step 800 when a user calibrates the optical switch, e.g., optical switch 130. Prior to operating optical switch 130 (FIG. 1), the user should construct an optical power versus voltage diagram to generate Vmin, $V_a$, and $V_b$, as shown in FIG. 4 and FIG. 5.

In step 810 (FIG. 8), signal processing unit 170 (FIG. 1) monitors optical switch 130 via an input received from transimpedance amplifier 160 to determine whether a voltage drift has occurred. Processor 180 receives from transimpedance amplifier 160 a measured voltage of an optical output of optical switch 130 at voltage $V_a$ in a predetermined time interval, e.g., 50 msec, followed by a measured voltage of the optical output of optical switch 130 at voltage $V_b$ in the next predetermined time interval, continuously. Processor 180 (FIG. 1) may perform signal averaging so as not to rely on a single value of $V_a$ or $V_b$, thus reducing error. Illustratively, processor 180 may sum and store 1000 pulses measured at voltage $V_a$ and sum and store 1000 pulses measured at voltage $V_b$ over a given time interval.

In step 820 (FIG. 8), it is necessary for processor 180 (FIG. 1) to determine whether a voltage drift has occurred for optical switch 130 by comparing the received voltage, e.g., $V_b$, to the previously measured voltage, e.g., $V_a$.

If the test result in conditional branch point 820 (FIG. 8) is NO, indicating that there is no voltage drift, i.e., $P(V_a)$ equals $P(V_b)$ (FIG. 4), then control is passed to step 810 (FIG. 8). If the test result in step 820 is YES, indicating that a voltage drift has occurred, i.e., $P(V_a)$ does not equal $P(V_b)$, then control is passed to step 830.

In step 830 (FIG. 8), processor 180 (FIG. 1) determines the corrective voltage needed. The corrective voltage is a function of a measured visibility function value, determined as a function of the measured values for $V_a$ and $V_b$.

In step 840 (FIG. 8), processor 180 (FIG. 1) instructs a voltage generator, e.g., voltage generator 290 (FIG. 2), within signal processing unit 170 to apply the corrective voltage, e.g., a pulse train, to a single port of optical switch 130 (FIG. 1) providing equal corrections to each of the three voltages, i.e., Vmin, $V_a$, and $V_b$ as shown in FIG. 4 and FIG. 5. The pulse train may have an amplitude that increases or decreases the measured voltage output of optical switch 130 to achieve the minimum null signal value (FIG. 4 and FIG. 5). The decision to increase or decease the voltage will depend on whether $V_a > V_b$ or $V_b > V_a$.

The process is exited in step 840 (FIG. 8).

Figure 9:
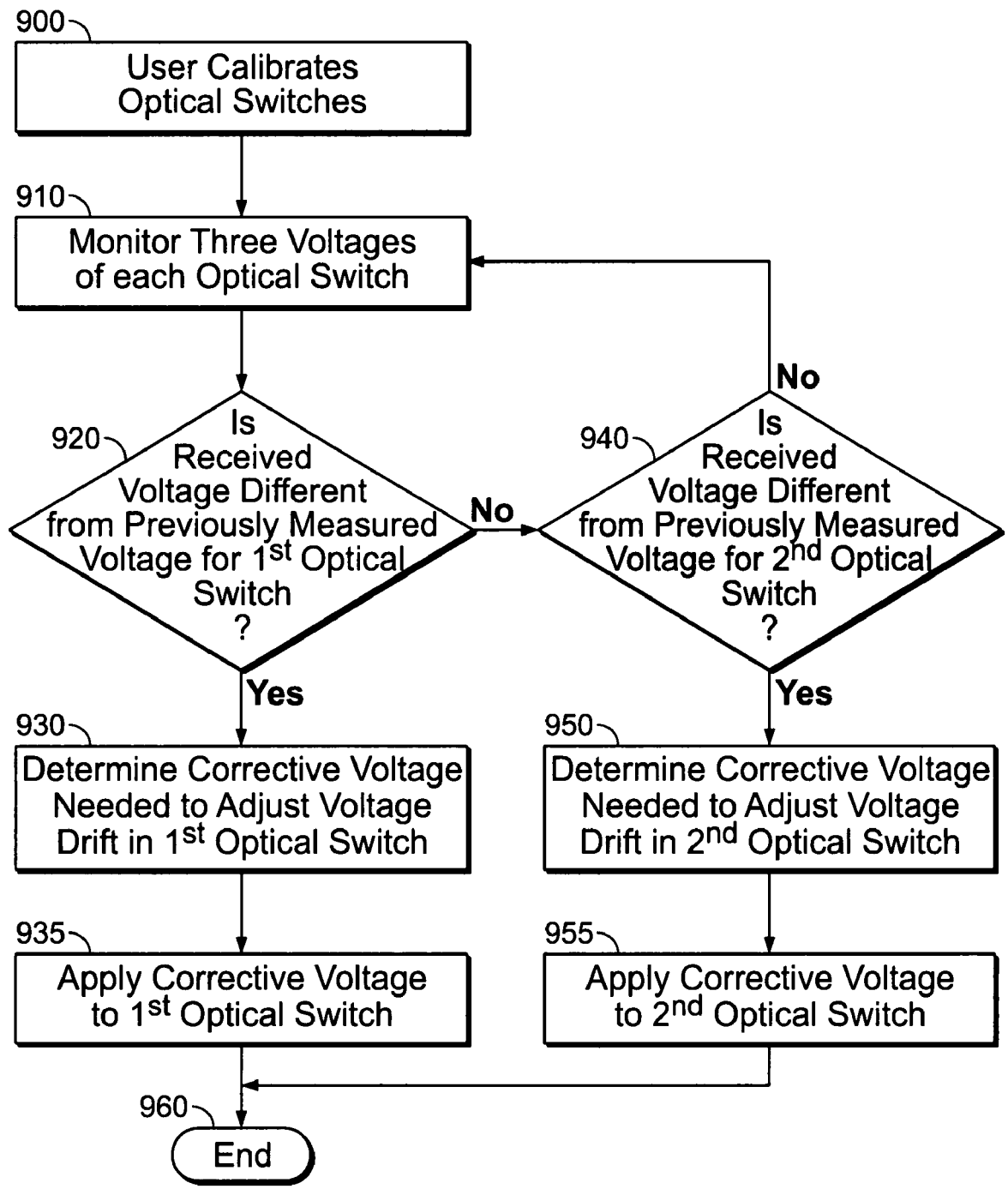
FIG. 9 shows another illustrative flow chart for a method of operating the continuous optical null tracking method for optical switch arranged in accordance with the principles of the invention.

FIG. 9 shows another illustrative flow chart for a method of operating the continuous optical null tracking method for optical switch in accordance with the principles of the invention. The process is entered in step 900 when a user calibrates multiple optical switches, e.g., optical switch 130 and optical switch 330, connected in series. Prior to operating optical switch 130 and optical switch 330, the user should construct an optical power versus voltage diagram for each optical switch to generate Vmin, $V_a$, and $V_b$, as shown in FIG. 4 and FIG. 5.

In step 910 (FIG. 9), signal processing unit 370 (FIG. 3) monitors optical switch 130 and optical switch 330 via an input received from transimpedance amplifier 160 to determine whether a voltage drift has occurred. Processor 380 receives from transimpedance amplifier 160 a measured voltage of an optical output of optical switch 130 at voltage $V_a$ in a predetermined time interval, e.g., 50 msec, followed by a measured voltage of the optical output of optical switch 130 at voltage $V_b$ in the next predetermined time interval, continuously. Also, processor 380 receives from transimpedance amplifier 160 a measured voltage of an optical output of optical switch 330 at voltage $V_a$ in a predetermined time interval followed by a measured voltage of the optical output of optical switch 330 at voltage $V_b$ in the predetermined time interval, continuously. Processor 380 (FIG. 3) may perform signal averaging so as not to rely on a single value of $V_a$ or $V_b$ for each switch, thus reducing error. Illustratively, processor 380 may sum and store 1000 pulses measured at voltage $V_a$ and sum and store 1000 pulses measured at voltage $V_b$ over a given time interval for optical switch 130. Also, processor 380 may sum and store 1000 pulses measured at voltage $V_a$ and sum and store 1000 pulses measured at voltage $V_b$ over a given time interval for optical switch 330.

In step 920 (FIG. 9), it is necessary for processor 380 to determine whether a voltage drift has occurred for optical switch 130 by comparing the received voltage, e.g., $V_b$, to the previously measured voltage, e.g., $V_a$, for optical switch 130.

If the test result in conditional branch point 920 (FIG. 9) is NO, indicating that there is no voltage drift, i.e., $P(V_a)$ equals $P(V_b)$ (FIG. 4), then control is passed to step 940 (FIG. 9). If the test result in step 920 is YES, indicating that a voltage drift has occurred, i.e., $P(V_a)$ does not equal $P(V_b)$, then control is passed to step 930.

In step 930 (FIG. 9), processor 380 (FIG. 3) determines the corrective voltage needed for optical switch 130. The corrective voltage is a function of a measured visibility function value, determined as a function of the measured values for $V_a$ and $V_b$ for optical switch 130.

In step 935 (FIG. 9), processor 380 (FIG. 3) instructs a voltage generator, e.g., voltage generator 290, within signal processing unit 370 to apply a corrective voltage, e.g., a pulse train, to a single port of optical switch 130 (FIG. 3) providing equal corrections to each of the three voltages, i.e., Vmin, $V_a$, and $V_b$ as shown in FIG. 4 and FIG. 5. The pulse train may have an amplitude that increases or decreases the measured voltage output of optical switch 130 to achieve a minimum null signal value (FIG. 4 and FIG. 5). The decision to increase or decease the voltage will depend on whether $V_a > V_b$ or $V_b > V_a$. Then control is passed to step 960 (FIG. 9).

In step 940 (FIG. 9), it is necessary for processor 380 to determine whether a voltage drift has occurred for optical switch 330 by comparing the received voltage, e.g., $V_b$, to the previously measured voltage, e.g., $V_a$, for optical switch 330.

If the test result in conditional branch point 940 (FIG. 9) is NO, indicating that there is no voltage drift, i.e., $P(V_a)$ equals $P(V_b)$ (FIG. 4), then control is passed to step 910 (FIG. 9). If the test result in step 940 is YES, indicating that a voltage drift has occurred, i.e., $P(V_a)$ does not equal $P(V_b)$, then control is passed to step 950.

In step 950 (FIG. 9), processor 380 (FIG. 3) determines the corrective voltage needed for optical switch 330. The corrective voltage is a function of a measured visibility function value, determined as a function of the measured values for $V_a$ and $V_b$ for optical switch 330.

In step 955 (FIG. 9), processor 380 (FIG. 3) instructs a voltage generator, e.g., voltage generator 390, within signal processing unit 370 to apply a corrective voltage, e.g., a pulse train, to a single port of optical switch 330 (FIG. 3) providing equal corrections to each of the three voltages, i.e., Vmin, $V_a$, and $V_b$ as shown in FIG. 4 and FIG. 5. The pulse train may have an amplitude that increases or decreases the measured voltage output of optical switch 330 to achieve the minimum null signal value (FIG. 4 and FIG. 5). The decision to increase or decease the voltage will depend on whether $V_a > V_b$ or $V_b > V_a$.

The process is exited in step 960 (FIG. 9).

The steps or operations described herein are intended as examples. There may be many variations to these steps or operations without departing from the spirit of the invention. For instance, the steps may be performed in a different order, or steps may be added, deleted, or modified.

The foregoing merely illustrates the embodiments of the invention. It will thus be appreciated that those skilled in the art will be able to devise various arrangements, which, although not explicitly described or shown herein, embody the principles of the invention, and are included within its spirit and scope.

What is claimed:

1. An apparatus operable to correct a voltage drift of an optical switch, comprising:

means for monitoring three voltages of the optical switch; and means for applying a voltage to one port of the optical switch to adjust the three voltages in real-time;

wherein the means for monitoring is operable to a) compare a received voltage output of the optical switch to a previously measured voltage output of the optical switch, b) make a determination as to whether there exists at least one difference between the received voltage output and the previously measured voltage output, c) determine a measured visibility function value based on the received voltage output and the previously measured voltage output when the at least one difference exists, and d) instruct the means for applying a voltage to apply a corrective voltage to the one port of the optical switch when the at least one difference exists, wherein the corrective voltage is a function of the measured visibility function value.

2. The apparatus of claim 1 wherein the means for monitoring receives an electrical representation of an optical output of the optical switch in a predetermined time interval continuously.

3. The apparatus of claim 2 wherein the predetermined time interval is at least 50 milli-seconds.

4. The apparatus of claim 2 wherein the means for monitoring reduces error in the electrical representation of the optical output from the optical switch via a signal averaging process.

5. The apparatus of claim 1 wherein the corrective voltage has an amplitude that increases or decreases the measured visibility function value to achieve a minimum null signal value.

6. The apparatus of claim 1 wherein the means for applying a voltage provides equal corrective voltages to each of the three voltages.

7. The apparatus of claim 1 wherein the optical switch is selected from the group consisting of a) Mach Zehnder and b) delta beta reversal switches.

8. An apparatus to correct a voltage drift of first and second optical switches connected in series, comprising:
   a processor operable to determine whether the first and second optical switches have experienced the voltage drift; and
   a voltage generator connected to the processor, the voltage generator being operable to apply corrective voltages to one port of the first optical switch and to one port of the second optical switch in real-times;
   wherein the processor a) determines, upon detection of the voltage drift in the first optical switch, a first corrective voltage needed for the first optical switch based on a measured visibility function value for the first optical switch and b) instructs the voltage generator to apply the first corrective voltage to adjust three voltages of the first optical switch to achieve a minimum null signal value;
   wherein the processor a) determines, upon detection of the voltage drift in the second optical switch, a second corrective voltage needed for the second optical switch based on a measured visibility function value for the second optical switch and b) instructs the voltage generator to apply the second corrective voltage to adjust three voltages of the second optical switch to achieve a minimum null signal value.

9. A method of correcting a voltage drift of an optical switch, the method comprising the steps of:
   monitoring three voltages of the optical switch; and
   comparing a received voltage output of the optical switch to a previously measured voltage output of the optical switch;
   making a determination as to whether there exists at least one difference between the received voltage output and the previously measured voltage output; and
   applying a corrective voltage to one port of the optical switch when the at least one difference exists to adjust the three voltages in real-time;
   determining a measured visibility function value based on the received voltage output and the previously measured voltage output when the at least one difference exists, wherein the corrective voltage is a function of the measured visibility function value.

10. The method of claim 9 further comprising the step of monitoring electrical representations of a received optical output from the optical switch in a predetermined time interval continuously.

11. The method of claim 10 wherein the predetermined time interval is at least 50 milli-seconds.

12. The method of claim 10 further comprising the step of reducing error in the electrical representation of the optical output of the optical switch via a signal averaging process.

13. The method of claim 9 wherein the corrective voltage has an amplitude that increases or decreases the measured visibility function value to achieve a minimum null signal value.

14. The method of claim 9, wherein the applying the voltage step further comprises the step of applying equal corrective voltages to each of the three voltages.

15. The method of claim 9, wherein the optical switch is selected from the group consisting of a) Mach Zehnder and b) delta beta reversal switches.

16. A method of correcting a voltage drift of first and second optical switches connected in series, the method comprising the steps of:
   determining whether the first and second optical switches have experienced the voltage drift;
   determining, upon detection of the voltage drift in the first optical switch, a first corrective voltage needed for the first optical switch based on a measured visibility function value for the first optical switch; and
   instructing the voltage generator to apply the first corrective voltage to adjust three voltages of the first optical switch to achieve a minimum null signal value;
   determining, upon detection of the voltage drift in the second optical switch, a second corrective voltage needed for the second optical switch based on a measured visibility function value for the second optical switch; and
   instructing the voltage generator to apply the second corrective voltage to adjust three voltages of the second optical switch to achieve a minimum null signal value;
   applying the first corrective voltage to one port of the first optical switch and the second corrective voltage to one port of the second optical switch in real-time.

17. An apparatus to correct a voltage drift of an optical switch, comprising:
   a processor operable to determine whether the optical switch has experienced the voltage drift; and
   a voltage generator connected to the processor, the voltage generator being operable to apply a corrective voltage to one port of the optical switch in real-time;
   wherein the processor a) determines the corrective voltage upon identifying at least one difference between a received voltage output of the optical switch and a previously measured voltage output of the optical switch, wherein the corrective voltage is a function of a measured visibility function and b) instructs the voltage generator to apply the corrective voltage to adjust three voltages of the optical switch to achieve a minimum null signal value when the at least one difference exists.

* * * * *